United States Patent [19]
Menconi

[11] Patent Number: 5,847,374
[45] Date of Patent: Dec. 8, 1998

[54] SMART CARD HAVING A PLURALITY OF DATA FIELDS WITH REFERENCE ZONES AND VALIDATION BITS

[75] Inventor: Martial Menconi, Paris, France

[73] Assignee: France Telecom, Paris, France

[21] Appl. No.: 985,141

[22] Filed: Dec. 4, 1997

Related U.S. Application Data

[62] Division of Ser. No. 639,268, Apr. 24, 1996, Pat. No. 5,767,504.

[30] Foreign Application Priority Data

Apr. 26, 1995 [FR] France .................................. 95 04992

[51] Int. Cl.⁶ ..................................................... G06K 19/06
[52] U.S. Cl. ............................. 235/492; 235/380; 902/26
[58] Field of Search .................................... 235/492, 451, 235/375, 494, 380, 379; 902/26, 28

[56] References Cited

U.S. PATENT DOCUMENTS

| | | | |
|---|---|---|---|
| 4,204,113 | 5/1980 | Giraud et al. | 235/375 |
| 4,992,646 | 2/1991 | Collin | 235/375 |
| 5,033,021 | 7/1991 | Barakat | 364/900 |
| 5,191,193 | 3/1993 | LeRoux | 235/379 |
| 5,264,689 | 11/1993 | Maes et al. | 235/492 |
| 5,285,415 | 2/1994 | Depret et al. | 235/380 X |
| 5,386,539 | 1/1995 | Nishi | 235/492 X |
| 5,495,098 | 2/1996 | Pailles et al. | 235/492 |
| 5,536,923 | 7/1996 | Foglino | 235/380 |
| 5,629,513 | 5/1997 | Geronimi et al. | 235/492 |

Primary Examiner—Anita Pellman Gross
Assistant Examiner—Michael G. Lee
Attorney, Agent, or Firm—Pearne, Gordon, McCoy & Granger LLP

[57] ABSTRACT

A method of preventing removal of a smart card having a counter zone associated with a first reference zone, and a balance zone associated with a second reference zone. The counter zone has at least two levels of counters, each having at least two bits. The counter zone is operable in accordance with the abacus principle. The first reference zone has at least one register with at least two bits and is operable to display the proper erasing of the counters. The second reference zone has at least two fields. Bits of a balance are written simultaneously in the balance zone and in the second reference zone. The balance zone and the second reference zone each include one validation bit making it possible to know if the balance is fully written.

9 Claims, 2 Drawing Sheets

SMART CARD HAVING A PLURALITY OF DATA FIELDS WITH REFERENCE ZONES AND VALIDATION BITS

This application is a divisional of U.S. patent application Ser. No. 08/639,268, filed Apr. 24, 1996, now U.S. Pat. No. 5,767,504.

FIELD OF THE INVENTION

The present invention concerns a smart card and a method for implementing said card.

BACKGROUND OF THE INVENTION

Since 1983, France Télécom has not ceased in increasing its park of card telephone kiosks on French territory. The number of telephone kiosks with installed cards is currently more than 120,000 and more than 4,000 domestic telephones installed with cards inside. Since 1993, the sales of 'phone cards reached 100,000,000 per annum. France Télécom is continuing its developments so as to offer new terminals, such as Publifax and the home kiosk.

France Télécom has been confronted with a need to export a higher counting capacity, especially as regards operators who practise extremely low telephone call tariffs and extremely high international telephone call tariffs. So as to meet these requirements, the SEPT has proposed creating news cards comprising, not merely an increased capacity, but also a more flexible personalisation and active security.

A new 'phone card, namely a second generation or <<T2G>> card, authorizes a much higher counting capacity via an abacus mechanism and its electric current consumption is much lower. As regards security, it functions according to a <<challenge/response>> mechanism: at the time a risk is sent, the card knows how to calculate the signature by means of a secret it solely contains and is the only element to contain said secret. With the new CMOS (<<Complementary Metal Oxide Semiconductor>>) technology, an external programming voltage is no longer necessary. This voltage is generated internally by a <<charge pump>> which, from 5 volts, produces the required voltage to tilt the bits from the memory at the time units are consumed.

A component (ST 1333) has been developed for this second generation card by the SGS Thomson company; as shown on FIG. 1, this component contains an EEPROM memory (<<Electronically Erasable Programmable Read Only Memory>>) of 272 bits and has no standard microprocessor architecture but a specific architecture so as to optimize its cost.

One of the advantages of using an EEPROM type smart card is that this memory can be abacus-organized. Now the programming blocks of the chip of this card are solely provided to receive any of the following three elementary commands: clearing memory, incrementation and reading, writing or erasing. Several of these elementary commands therefore need to follow one another so as to update the abacus when two successive levels of the abacus are concerned.

The component ST 1333 is in fact a series memory of 272 bits (read and written in series) managed by an address counter which is incremented by one on each clock strike and cleared by the <<reset>> signal.

The control logic of this component has several rôles:

it controls access to the memory (reading, writing, erasing) according to the addressed zones and the phase in which the circuit is located: test, initialization, use;

by means of an authentication calculation unit, it makes it possible to calculate a signature on four bits on the basis of the internal data of the memory whose secret key, and a risk with thirty-two bits provided from an external source. This process may be repeated several times so as to adjust the level of security to the level required. Thus, the card cannot be <<cloned>> as this would require a knowledge of the secret key and the authentication calculation algorithm.

it allows for the management of a high capacity irreversible counter. This counter is formed of six levels of eight bits and functions in abacus: when the level i is full, one bit needs to be added to the level i+1, and the level i can then be erased. Therefore, this involves an eight-based counting on six figures giving a capacity of $8^6 \simeq 256,000$.

This organization results in having extremely simple logic as regards the circuit. Should the card be withdrawn too soon, so as to ensure that the counter is in a non-significant state, a reference register mechanism has been provided: for example, the register indicates that the stage i+1 has been inscribed but the level i has not been erased. Therefore, on the next use of the 'phone card, the terminal is able to replace the counter into a significant state.

The present invention concerns an integrated circuit of this type for a passive type portable support, that is not including any internal microprocessor but merely a memory and decoding means so as, in response to a limited number of control signals, sequentially access successive blocks of this memory and carry out there reading, writing or erasing operations.

A problem occurs if, for any reason, the processing of the card is suddenly interrupted before the end of updating the abacus.

The French patent FR-2 678 094 of France Télécom and the Post Office defines a basic reference mechanism which, following a sudden pulling out of a card before the end of updating the abacus, will end this updating at a subsequent use of the card.

This patent describes an integrated circuit for a portable unit counting support including p data counting memory levels containing numbers of respective blocks n1 . . . np, a writing being carried out in a block of an upper level each time when all the blocks of the lower level have been validated, the blocks of the lower levels then being invalidated. In addition, this circuit includes reference levels identical to p−1 upper row levels of the p counting levels, the addressing logic of the reference levels being such that the blocks of these reference levels are writing-addressed simultaneously with the blocks of the corresponding counting blocks and, after a writing, are erase-addressed at the same time as the blocks of the levels lower than the one which has just been validated.

Zones Concerned of the Smart Card

In this circuit, two zones of the smart card are concerned by the counting.

one zone of the counters and formed of at least two levels of counters (C1 and Cy) each with x bits, such as eight. This counter portion can be used according to the abacus principle. For counting, bits are regularly written in a counter Cn (the first <<free>> counter). When there is no longer any unrecorded bit in the counter Cn, a bit is written into the <<upper counter Cn+1 which authorizes erasing of the counter Cn, said erasing being carried out by a second writing command at the same address;

a zone of reference counters formed of y−1 reference registers (Rty−1 to RT1) each of x bits. They are used to display the proper erasing of the counters. If one of the counters Cn has not been correctly erased, the position of the bit in the register Rtn indicates on which bit of the counter CN+1 the erasing sequence has been broken. The reference registers are associated with the counters so that:

when a bit is written in the zone Cn, the internal mechanism of the component writes at the same time a bit in the reference register RTN−1 in the same position as that of the bit written in the counter Cn, the reference register RTN−1 is erased at the same time as the associated zone Cn−1 at the time of the second writing command.

Ways Means for Incrementing Counters

If one takes the simplest case of a two level counter with the counter having the value 15:

| Level bit | Contents 8 7 6 5 4 3 2 1 | Modulo | Level value |
|---|---|---|---|
| C2 | 0 0 0 0 0 0 1 1 | 8 | 1 * 8 = 8 |
| C1 | 1 1 1 1 1 1 1 1 | 1 | 7 * 1 = 7 |

If it is now desired to increment the counter of the card by one unit, the final value is 16. In order to carry out this operation, the publiphone shall seek out the first <<0>> bit which shall be found in the lowest counter and write there a <<1>>.

Having regard to the state of the counter, the bit 3 of C2 needs to be positioned. In order to carry out this operation, a double writing needs to be effected as indicated below:

| | First order for writing on the bit 3 of C2 | | |
|---|---|---|---|
| Level bit | Contents 8 7 6 5 4 3 2 1 | Modulo | Level value |
| C2 | 0 0 0 0 0 1 1 1 | 8 | 2 * 8 = 16 |
| C1 | 1 1 1 1 1 1 1 1 | 1 | 7 * 1 = 7 |

After the first writing order, the level C2 has been incremented but the level C1 is still at its initial value. The value of the counter is therefore 15+8=23.

| | Second order for writing on the bit 3 of C2 | | |
|---|---|---|---|
| Level bit | Contents 8 7 6 5 4 3 2 1 | Modulo | Level value |
| C2 | 0 0 0 0 0 1 1 1 | 512 | 2 * 8 = 16 |
| C1 | 0 0 0 0 0 0 0 1 | 1 | 0 * 1 = 0 |

The final value of the counter is 23−7=16, which corresponds to the amount which would be inscribed.

Anti-Removal Indicators

The implementation of the anti-removal mechanism is illustrated by the tables below (with displaying of the reference zone) on the basis of the same example (incrementation by one unit from a counter whose value is 15):

| | First order for writing of bit 3 of C2 | | |
|---|---|---|---|
| Level bit | Contents 8 7 6 5 4 3 2 1 | Modulo | Level value |
| C2 | 0 0 0 0 0 1 1 1 | 512 | 2 * 8 = 16 |
| RT1 | 0 0 0 0 0 1 0 0 | | |
| C1 | 1 1 1 1 1 1 1 1 | 1 | 7 * 1 = 7 |

| | Second Order for writing bit 3 of C2 | | |
|---|---|---|---|
| Level bit | Contents 8 7 6 5 4 3 2 1 | Modulo | Level value |
| C2 | 0 0 0 0 0 1 1 1 | 512 | 2 * 8 = 16 |
| RT1 | 0 0 0 0 0 0 0 0 | | |
| C1 | 0 0 0 0 0 0 0 0 | 1 | 0 * 1 = 0 |

Resumption Procedure

When the card is removed from the reader between two writings, at the moment of the next use of the card on another telephone kiosk, a special procedure is implemented. In fact, the bit 3 of RT1 positioned indicates an interruption of the mechanism for updating the counter during a double writing of bit 3 of C2. It merely suffices to therefore carry out a writing sequence on the bit 2 of C2. This requires a double writing, the details of this operation being identical to those of the normal procedure (see above). this procedure places the counter in the expected final configuration. It then merely remains to only write the bit 1 of C1 so as to re-establish the counter 1 in a legal configuration.

Secondly, smart cards may contain a cabled authentication circuit and a logic for access conditions by zones. A French patent application FR-2 704 081 of France Télécom and the Post Office describes a particular implementation of these particular functions so as to produce a low-cost <<purse card>>.

So as to embody the low-cost purse function, the card needs to contain three zones: a balance zone, a counter zone and a certificate zone. The certificate zone includes the identity of the security module which has generated the certificate and thus has cashed the debit amount of the purse. The card shall contain means so that the counter (accessible on writing and writing but erasable) is incremented prior to updating of the certificate and balance zones. The balance and certificate zones are accessible on writing and reading but are only erasable if the contents of the counter have been incremented.

The electronic purse function is based on the execution of a double authentication procedure, one at the start of the transaction to establish the authenticity of the card and its initial contents, and the other at the end of the transaction after the debit has been calculated and the memory contents have been updated. The updating of the purse consists of incrementing the counter by one unit, erasing the former balance and previous certificate and of writing instead the new balance and new certificate.

The drawback of the current technique is that it is unable to manage a resumption mechanism concerning the balance+certificate zone should the card be removed from the terminal during the sequence for updating the balance and certificate. The anti-removal mechanism only concerns the zone of the counters and not the balance+certificate zone. In fact, the balance and certificate are located at zero if the card is pulled out between the time when the balance and certificate are erased and the moment when the new values of the balance and certificate are written. Similarly, the balance and certificate are found at an undetermined value if the card is pulled out during the phase for writing the new balance and new certificate.

The object of the invention is to improve the smart card anti-removal mechanisms so as to be able to manage a resumption mechanism concerning the balance+certificate zone with the same effectiveness as regards the counters zone.

SUMMARY OF THE INVENTION

The present invention concerns a smart card including:

a counter zone formed of at least two levels of counters each of at least two bits and able to be used according to the abacus principle;

a first references zone formed of at least two reference registers of at least two bits each and used to display the proper erasing of the counters;

wherein it includes a balance zone accessible in writing and reading and solely erasable if the contents of the counter zone have been incremented and wherein it includes a second reference zone structured into two fields associated with the balance zone, the writing of the bits of the balance taking place simultaneously in the balance zone and second reference zone, and wherein the balance zone and second reference zone each include one validation bit making it possible to know if the balance present is fully written.

It further includes a certificate zone accessible in writing and reading and solely erasable if the contents of the counter zone have been incremented, a third reference zone structured into two fields associated with the certificate zone, the writing of the bits of the certificate taking lace simultaneously in the certificate zone and in the third reference zone. The certificate zone and the third reference zone each include one validation bit making it possible to know if the certificate present is fully written.

The present invention more particularly concerns cards in which the memory is electrically erasable, such as an EEPROM type memory, that is a programmable and electrically erasable dead memory.

One current application of smart cards concerns prepaid cards. In these cards, the blocks of the memory are initially in a particular state which is modified in response to external pulses corresponding to cost units of any service provided by a reader in which the card is inserted.

The invention can also be applied for other uses where account units are recorded in the card and are decremented or incremented as the card is used; these units may have a monetary value.

This smart card may also be a phonecard type card.

The present invention also concerns a method for preventing removal of the smart card used in the purse mode, wherein:

a validation bit makes it possible to clearly know if the present balance is fully written, this validation bit being positioned on implementing a double writing mechanism, the balance being regarded as not written if this bit is not positioned;

a mechanism for resumption of the transaction on the basis of the prior balance, this mechanism being based on a reference register zone of a data field (the balance, for example) structured into two fields.

Similarly:

a validation bit makes it possible to clearly know if the present certificate is fully written, this validation bit being positioned on implementation of a double writing mechanism, the certificate being regarded as not written if this bit is not positioned;

a mechanism for resumption of the transaction on the basis of the prior certificate and based on a reference register zone of a data field structured into two fields.

A writing is simultaneously preferably written in a balance zone and a reference zone. The reference zone is managed by the circuit of the card. Each reference zone is cut into two zones. The tilting between the reference zones is managed by virtue of the value of a validation bit of reach reference zone or by the respective value of the balance and reference balance if these validation bits are equal. Each reference zone is erased in cases of resetting if the corresponding validation bit is not positioned. The double writing of the validation bit provokes the erasing of the reference zone corresponding to the preceding balance.

By means of the present invention, it is possible to set up open prepayment systems. This concerns systems involving an organism issuing electronic money, users possessing cards precharged by the issuing body, terminals able to provide certain services and accordingly debit the cards and collect the amounts derived from several cards. The organism owning these terminals is paid by the issuer according to the amount of units it has collected. The open nature of this system derived from the issuing organism is not necessarily merged with the service suppliers possessing the terminals.

If the invention is more particularly applicable to these systems because it is able to resolve certain problems linked to <<open>> characteristics, it is nevertheless not merely limited to these systems and could also be applied to closed systems where the emitting body would own the terminals.

DETAILED DESCRIPTION OF THE PREFERRED EMBODIMENTS

For reasons of simplicity, only smart cards shall be referred to as this concerns a support more currently used. however, it is clear that any other portable medium may be used.

The rest of the description relates to the anti-removal mechanism concerning the balance of the purse. It is clear that the same mechanism may be applied to the certificate (proof of authenticity).

Two additional mechanisms are able to attain the preceding objective:

In a first mechanism, a validation bit makes it possible to know without doubt whether the present balance is fully written. This validation bit is positioned by implementing a double writing mechanism. This validation bit guarantees that the corresponding balance is fully written when it concerns the actual balance or the balance reference. It is written (by the application) when the corresponding balance has also been written. If this bit is not positioned, the balance is regarded as not written.

A second mechanism for resuming the transaction on the basis of the previous balance depends on a reference register zone of a data field (the balance, for example) structured into two fields.

The functioning of the invention is as follows:

| Zone type | Contents<br>8 7 6 5 4 3 2 | Validation bit |
|---|---|---|
| Balance | X X X X X X | X |
| Reference 1 | X X X X X X | X |
| Reference 2 | X X X X X X | X |

The validation bit (bit of row 1) guarantees that the corresponding balance is fully written, regardless of whether it concerns the actual balance or the balance reference. It is written (by the application) when the corresponding balance has also been written. If this bit is not positioned, the balance is regarded as not written. This validation bit is positioned by implementing a double writing mechanism.

The bits of the balance are written by simply writing simultaneously in the balance zone and in a reference zone (for example the reference zone 1), just like all the reference bits of the counter zone. Once the balance has been fully written, the validation bit in the balance zone and the associated reference zone authorizes the erasing of the other reference zone (zone 2 in the preceding example) by means of double writing.

Figure 1:
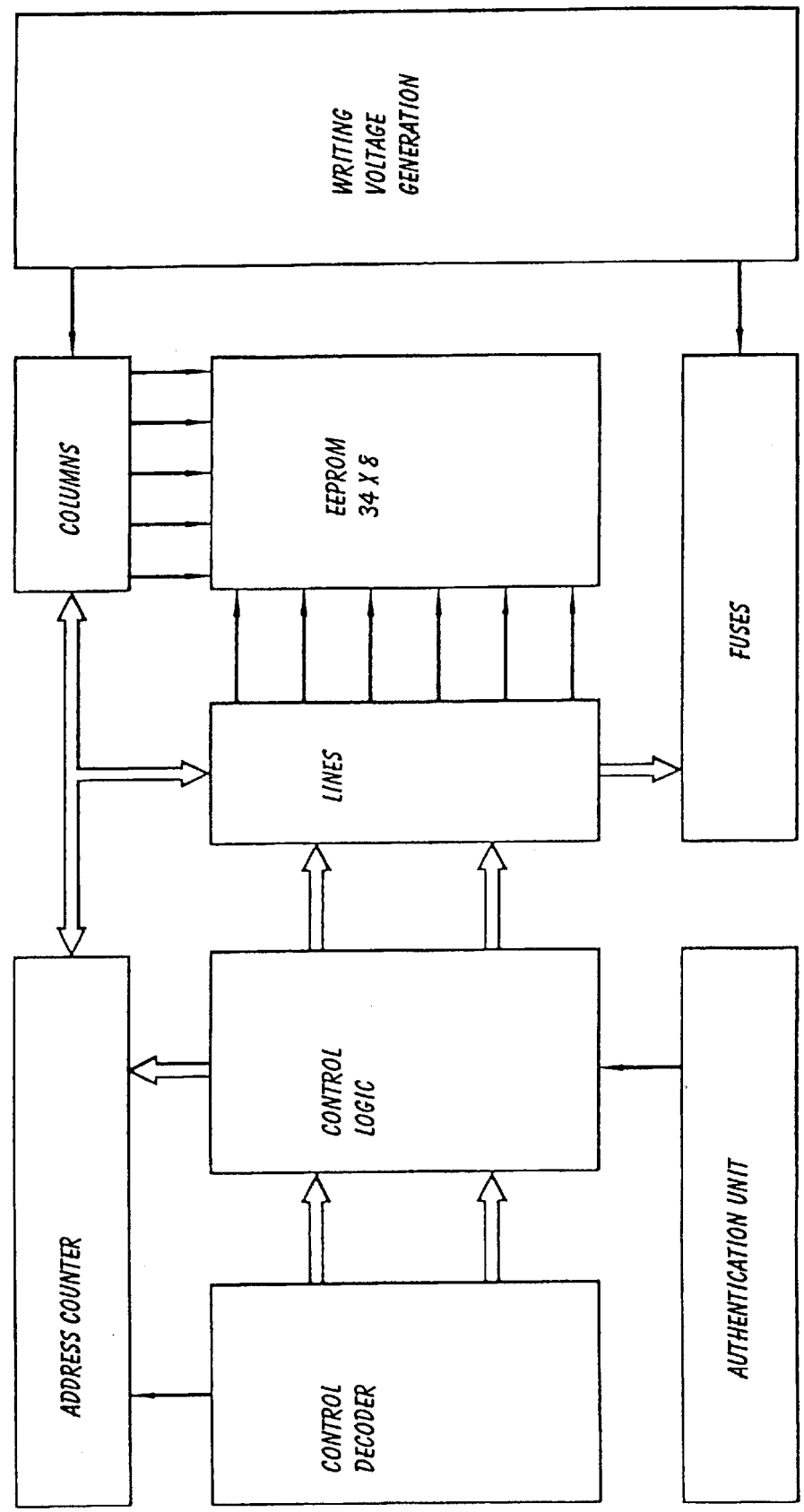
FIG. 1 illustrates the block diagram of the component of a T2G type card.
Figure 2:
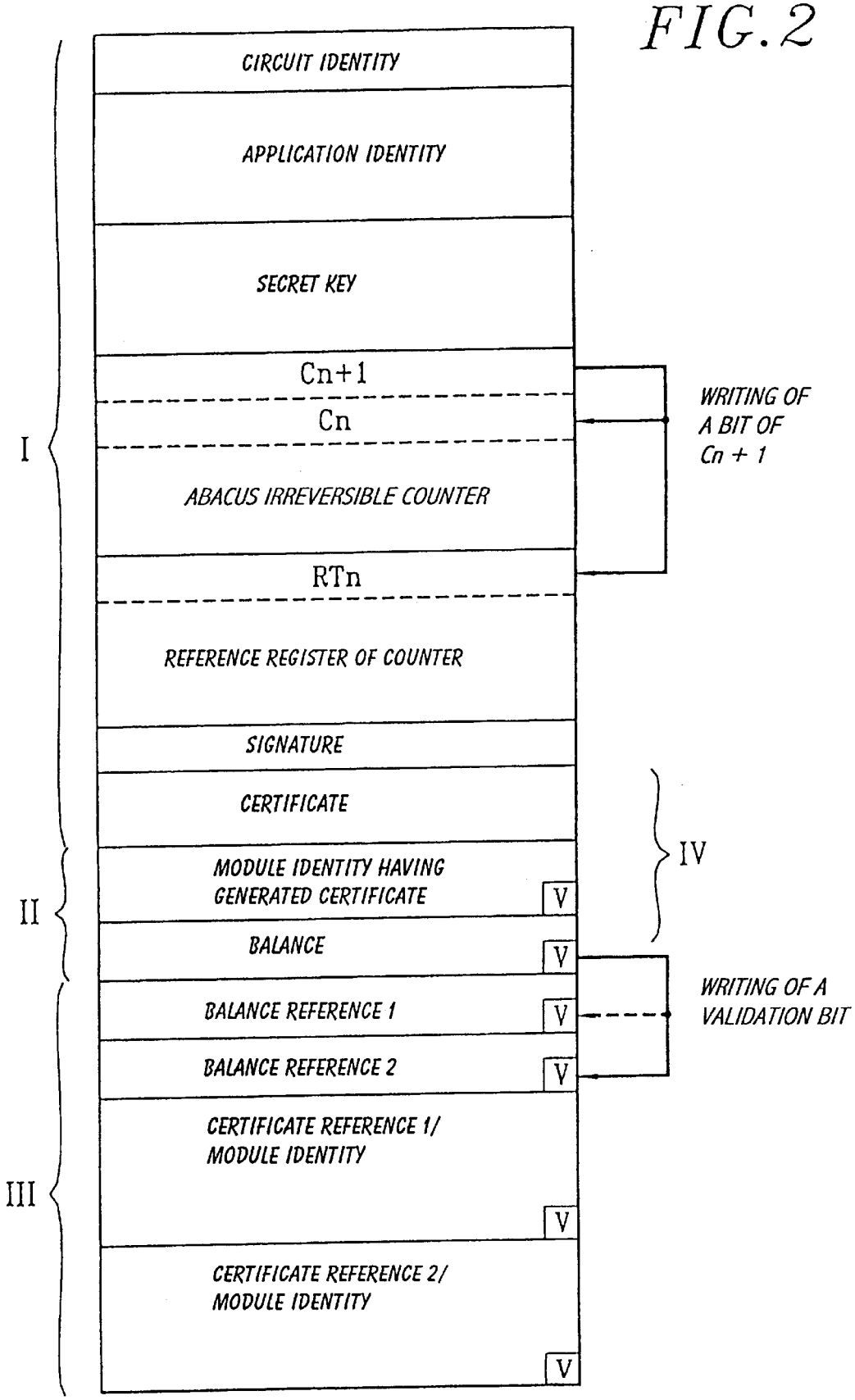
FIG. 2 shows a memory image revealing the internal mechanisms implemented by a simple T2G card, a <<purse>> T2G card and the additional mechanisms used as part of the invention.

The internal mechanisms then used by a TG2 card are illustrated on FIG. 2.

The card only knows three elementary commands:

resetting:

incrementation and reading;

writing.

The memory image of the card includes three zones:

zone I corresponds to the current T2G card (slightly rearranged);

zone II corresponds to the T2G <<purse>> card;

zone III corresponds to the invention.

<<v>> represents a validation bit.

These mechanisms may be subdivided into:

Internal Mechanisms Implemented by the <<Single>> T2G

The writing of a bit of Cn+1 includes:

a first writing which:
  authorizes the erasing of all the bits of the counter Cn,
  provokes the simultaneous writing of a bit in Rtn at the same position as the bit of Cn+1;

a second writing which:
  erases all the bits of the counter Cn,
  simultaneously erases the reference bit.

Additional Mechanisms Used by the <<Purse>> T2G

The amounts are counted in the <<balance>> zone and not in the <<counter>> zone.

The zone IV is only erasable after incrementing the counter and forms part of calculation of the signature.

Additional Mechanisms Used Within the Context of the Invention

The writing of the validation bit can be subdivided as follows:

a first writing of the validation bit which provokes the simultaneous writing of the validation bit of reference 1 of the <<free>> balance and which authorizes the erasing of the balance reference 2. The balance bits are written simultaneously in the balance zone and in the free reference zone;

a second writing of the validation bit which provokes the erasing of all the bits of the balance zone 2.

The same applies to the certificate zone (identity module).

The incrementation of the counter provokes the erasing of the <<balance>> and <<certificate>> zones and erasing of the <<balance>> and <<certificate>> reference zones whose validation bit is at 0.

The reference bit can only be written by the application when the balance itself is written.

Now, a description follows concerning the particular embodiments. Let us assume that the initial situation is the following: a balance of any amount is inscribed and validated (validation bit at 1) in the balance zone. The reference balance is inscribed and validated in the reference zone 2. In this example, the balance and its references are assumed to each remain on 8 bits (7 bits for the actual balance and one validation bit).

| Zone type | Contents<br>8 7 6 5 4 3 2 | Validation bit |
|---|---|---|
| Balance | X X X X X X | 1 |
| Reference 1 | 0 0 0 0 0 0 0 | 0 |
| Reference 2 | X X X X X X | 1 |

From the moment a new balance needs to be inscribed in the card, the transaction counter is incremented, which provokes the erasing of the current balance and of the associated validation bit (likewise erasing, if appropriate, of the reference whose system bit is at <<0>>).

| Zone type | Contents<br>8 7 6 5 4 3 2 | Validation bit |
|---|---|---|
| Balance | 0 0 0 0 0 0 0 | 0 |
| Reference 1 | 0 0 0 0 0 0 0 | 0 |
| Reference 2 | X X X X X X | 1 |

In this situation, the current balance is erased but its record exists in the validated reference zone. A resumption mechanism can therefore start on the basis of the reading of the amount inscribed in the valid reference (reference 2 in this instance).

Let us assume that the new balance to be inscribed is 32+16+2=50 units. The writing of the new balance is effected, both in the balance zone and in the <<free>> reference zone (the one whose reference bit is <<0>>).

| Zone type | Contents<br>8 7 6 5 4 3 2 | Validation bit |
|---|---|---|
| Balance | 0 1 1 0 0 1 0 | 0 |
| Reference 1 | 0 1 1 0 0 1 0 | 0 |
| Reference 2 | X X X X X X | 1 |

As long as the validation bit is not positioned, the balance is not regarded as written, and it is not known whether the low-weight bit should be written or not. The only definite balance is the preceding balance which is located in the validated reference zone (that is in the reference zone 2, the one who has the validation bit at <<1>>). Here again a resumption mechanism may start from a reading of the amount inscribed in the valid reference (reference 2). Previously, a double writing on the first available bit of the transaction counter shall have reset the balance and the reference whose validation bit is at <<0>>.

If the application estimates that the balance inscribed is correct, the validation bit is positioned. The writing of the validation bit in the balance zone is accompanied by the simultaneous writing of the validation bit in the associated reference zone and authorizes the erasing of the other reference zone (zone 2 in the preceding example) by means of double writing.

| Zone type | Contents<br>8 7 6 5 4 3 2 | Validation bit |
|---|---|---|
| Balance | 0 1 1 0 0 1 0 | 0 |
| Reference 1 | 0 1 1 0 0 1 0 | 0 |
| Reference 2 | X X X X X X | 1 |

If the card is removed from the telephone kiosk at this moment, a resumption mechanism is possible. It suffices to check the coincidence between the balance (including its validation bit) and one of the reference zones so as to continue the operations from this point.

The double writing of the reference bit provokes the erasing of the obsolete reference zone (the one not coinciding with the balance).

| Zone type | Contents<br>8 7 6 5 4 3 2 | Validation bit |
|---|---|---|
| Balance | 0 1 1 0 0 1 0 | 1 |
| Reference 1 | 0 1 1 0 0 1 0 | 1 |
| Reference 2 | 0 0 0 0 0 0 0 | 0 |

This operation finishes updating the balance.

One variant of the invention consists of treating the reference bit as follows: the writing of the validation bit in the balance zone is accompanied by the simultaneous writing of the validation bit in the associated reference zone and of erasing the reference bit of the other reference (zone 2 in the preceding example), the double writing of the system bit provoking the erasing of the reference by means of double writing.

What is claimed is:

1. Method for preventing removal of a smart card used in a purse mode, wherein:

a validation bit makes it possible to clearly know if a balance present is fully written, the validation bit being positioned when implementing a double writing mechanism, the balance being regarded as not written if the validation bit is not positioned;

a transaction resumption mechanism on a basis of a prior balance which depends on a reference zone of a data field structured into two fields.

2. Method according to claim 1, wherein:

a validation bit makes it possible to clearly know if a certificate present is fully written, the validation bit being positioned on implementing a double writing mechanism, the certificate being regarded as not written if the validation bit is not positioned;

a transaction resumption mechanism on the basis of the prior certificate which depends on a reference register zone of a data field structured into two fields.

3. Method according to claim 2, wherein each of the reference zones is managed by circuitry of the smart card.

4. Method according to claim 1, wherein writing is simultaneously carried out in a balance zone and in a reference zone.

5. Method according to claim 1, wherein each of the reference zones is managed by circuitry of the smart card.

6. Method according to claim 5, wherein each of the reference zones is split into two zones.

7. Method according to claim 6, wherein tilting between the reference zones is managed by means of a value of the validation bit of each of the reference zones or by the respective value of the balance or reference balance if the validation bits are equal.

8. Method according to claim 7, wherein the reference zone is erased in cases of resetting if a corresponding validation bit is not positioned.

9. Method according to claim 8, wherein the double writing of the validation bit provokes erasing of the reference zone corresponding to previous balance.

\* \* \* \* \*